(12) United States Patent
Sadriwalla

(10) Patent No.: US 9,505,199 B1
(45) Date of Patent: Nov. 29, 2016

(54) METHOD OF APPLYING A GRAPHIC IMAGE ON A SUBSTRATE

(71) Applicant: Abbas Sadriwalla, Fort Lauderdale, FL (US)

(72) Inventor: Abbas Sadriwalla, Fort Lauderdale, FL (US)

(*) Notice: Subject to any disclaimer, the term of this patent is extended or adjusted under 35 U.S.C. 154(b) by 0 days.

(21) Appl. No.: 15/172,236

(22) Filed: Jun. 3, 2016

(51) Int. Cl.
| B41J 2/325 | (2006.01) |
| B32B 37/00 | (2006.01) |
| B32B 37/10 | (2006.01) |
| B32B 37/06 | (2006.01) |
| B32B 38/10 | (2006.01) |
| B32B 37/12 | (2006.01) |
| D06P 5/24 | (2006.01) |
| D06P 5/30 | (2006.01) |
| D06P 3/32 | (2006.01) |

(52) U.S. Cl.
CPC ............ *B32B 37/025* (2013.01); *B32B 37/06* (2013.01); *B32B 37/10* (2013.01); *B32B 37/12* (2013.01); *B32B 38/10* (2013.01); *B32B 2307/54* (2013.01); *B32B 2519/00* (2013.01); *D06P 3/32* (2013.01); *D06P 5/003* (2013.01); *D06P 5/30* (2013.01); *Y10T 428/24802* (2015.01)

(58) Field of Classification Search
CPC .... Y10T 428/24802; D06P 3/32; D06P 5/30; D06P 5/003; B32B 37/025; B32B 37/10; B32B 7/06; B32B 38/10; B32B 37/12; B32B 2307/54; B32B 2519/00
USPC ........................................ 156/230
See application file for complete search history.

(56) References Cited

U.S. PATENT DOCUMENTS

| 5,271,990 A | 12/1993 | Kronzer et al. |
| 6,022,383 A | 2/2000 | Kuwabara et al. |
| 6,039,822 A | 3/2000 | Heyworth et al. |
| 6,357,845 B1 | 3/2002 | Kuwabara et al. |
| 6,951,671 B2 | 10/2005 | Mukherjee et al. |

(Continued)

FOREIGN PATENT DOCUMENTS

| CN | 2342008 Y | 10/1999 |
| CN | 1390710 A | 1/2003 |
| CN | 2651290 Y | 10/2004 |
| CN | 1899849 A | 1/2007 |
| CN | 1915681 A | 2/2007 |
| CN | 200974430 Y | 11/2007 |

(Continued)

OTHER PUBLICATIONS

SIF technology used to produce digitally printed leather Fabric Graohics—May 2009 by Tim Greene.

(Continued)

*Primary Examiner* — Philip Tucker
*Assistant Examiner* — Vicki Wu
(74) *Attorney, Agent, or Firm* — Jacqueline Tadros, Esq.; Jacqueline Tadros, P.A.

(57) ABSTRACT

A method of applying a graphic image on a target substrate using a liquid release coat applied to a carrier substrate, the release coat formulated to form a durable contiguous first film, a top coat applied to the first film and formulated to form a durable contiguous second film, a print coat applied to the second film and formulated to form a durable contiguous third film, wherein a transferred graphic image or material is superimposed on the third film and transferred to the target substrate to which a primer coat has been applied, the primer coat being formulated to form a contiguous fourth film on the target substrate, the carrier substrate with the superimposed graphic image is thereafter united with the target substrate, thereby sandwiching the graphic image between the primer coat of the target substrate on the one hand and the top coat of the carrier substrate on the other hand.

28 Claims, 5 Drawing Sheets

(56) References Cited

U.S. PATENT DOCUMENTS

| | | |
|---|---|---|
| 7,025,451 B2 | 4/2006 | Mabbott |
| 7,238,410 B2 | 7/2007 | Kronzer |
| 7,364,636 B2 | 4/2008 | Kronzer |
| 7,604,856 B2 | 10/2009 | Kronzer et al. |
| 7,699,458 B2 | 4/2010 | Mabbott |
| 8,562,777 B2 | 10/2013 | Drake |
| 2002/0121333 A1 | 9/2002 | Sofer et al. |
| 2006/0123554 A1 | 6/2006 | Kerle |
| 2008/0043087 A1* | 2/2008 | Cowan ............... C12N 15/8247 347/213 |

FOREIGN PATENT DOCUMENTS

| | | |
|---|---|---|
| CN | 103897492 A | 7/2014 |
| CN | 104354486 A | 2/2015 |

OTHER PUBLICATIONS

Overcoming Substrate Wetting Problems Paint & Coatings Industry—Mar. 1, 2003 by Nicholas P. Wood.

Silicon Release Coatings for the Pressure Sensitive Adhesive Industry.

* cited by examiner

METHOD OF APPLYING A GRAPHIC IMAGE ON A SUBSTRATE

BACKGROUND OF THE INVENTION

1. Field of the Invention

The present disclosure relates generally to a method of applying a graphic image on a substrate. More particularly, the invention relates to the use of a liquid release coating formulated to form a durable first film wherein the transferred graphic material is superimposed on a print film and sandwiched between a primer coat on the one hand and a top coat of the target substrate on the other hand.

2. Description of the Related Art

There are a myriad of methods of applying graphic images to a substrate. However the known methods have achieved limited success in applying complex multi colored high resolution graphic images to certain substrates, such as for example leather. Known methods of applying graphics to substrates, in particular, leather use adhesives or other material that often compromise the supple feel of the leather and don't protect the graphic from wear. Thus, many luxurious materials in which the texture of the material is paramount are often offered in monochromatic colors only. The prior art discloses equipment and methods that teach printing graphic images directly on a substrate, such as leather. Direct printing on a substrate is slow and expensive. It is additionally disadvantageous because the inks used contain hazardous ingredients and the graphic image remains unprotected and is subject to damage from wear.

The prior art teaches various methods for transferring digitally created images to a target surface via heat and/or pressure. In particular, U.S. Pat. Pub. No. 2008/0043087 A1 (to Cowan) teaches a method for creating and transferring digitally created images on a film to a target surface via heat and/or pressure transfer using a modified large-format digital printer. The method generally comprises the steps of modifying a large format digital printer to convert it from heat fused toner printing to cold toner printing, preparing a transfer film, creating a digital image, applying a release layer onto the transfer film, printing the image onto the release layer on the transfer film in a reverse mirror-image manner, applying an adhesive overtop said image, and pressure transferring the image onto the target substrate and peeling away the transfer film to selectively leave the image on the target substrate.

U.S. Pat. Pub. No. 2002/0131333 A1 (to Sofer et al.) discloses a method using a personal computer to create designs and or images. The design is first created on the computer and then printed onto a heat transfer sheet. The printed design on the heat transfer sheet is then heat pressed onto the leather (cow hide, calf, pig, goat, kid, sheep) material. The design may also be an image such as a picture created using a digital camera or manual camera.

U.S. Pat. No. 7,699,458 B2 (to Mabbott) teaches a method of providing a surface of a material with an image, including applying to the surface an image sheet comprising (i) a flexible layer of a shape memory polymer, and (ii) an image bonded to said layer by means of an image key coat. The image sheet is bonded to the surface by means of an adhesive and a process that involves heating of the shape memory polymer to a temperature above its Glass Transition Temperature.

U.S. Pat. No. 7,025,451 B2 (to Mabbott) discloses a method for transferring an image onto a non-planar surface in which an image transfer sheet comprising a shape memory polymer or like substance is used to transfer said image.

U.S. Pat. No. 6,039,822 (Heyworth et al.) discusses a process of applying decals to products having rough textured surfaces, such as products made from thermoplastic resins, leather, or synthetic leather. The decals applied to the products contain detailed multicolor graphic images made from a four color printing process. The decal applying process includes applying a first clear ink layer directly to the substrate surface, applying a water-release slide-off decal on top of the first clear ink layer, and applying a second clear ink layer over the applied decal to firmly bond the decal to the substrate surface. The two ink layers encapsulate the decal on the substrate surface, maintaining the integrity of the decal.

It is desirable to introduce an improved method of applying bright and complex multi graphics to a substrate, in particular luxury materials, such as for example fine leather, without altering the intrinsic nature and pliability of the leather or other substrate the graphic is adhered to and without damaging the material due to excessive heat or pressure used in the application process, while also protecting the graphic against normal wear and tear.

SUMMARY OF THE INVENTION

The invention relates to the enhancement of a target substrate, such as for example, leather, vinyl, canvas or the like, with a full color and high-resolution graphic image, without printing the image directly on the target substrate.

The invention allows the application of a complex multi colored graphic image to a target substrate while simultaneously protecting the graphic against normal wear and tear. A mirror image of the desired graphic is applied to the target substrate without altering the intrinsic nature of the target substrate or damaging the graphic image or the target substrate due to excessive heat or pressure.

The graphic image is superimposed on a print layer and contained between the target substrate that has been coated with primer coating on the one hand and a top coating of durable film that is weather resistant and additionally provides resistance to normal wear and tear. The invention avoids the use of glues or adhesives that are traditionally used in the prior art since glues and adhesives can be damaging to the supple feel of fine materials, such as for example, leather.

The invention alleviates the tedium of monochromatic or limited resolution graphics and permits the enhancement of a target surface via the use of high-resolution full color graphics that are also protected and therefore made durable as part of the process.

The inventive method uses a carrier substrate such as conventional market paper with a weight of over twenty (20) pounds. Preferably, the invention entails the use of heavy paper, such as a traditional card stock with a weight of over thirty-two (32) pounds. In a preferred embodiment, the card stock has a weight of eighty (80) pounds or more.

It is noted that silicone based coatings do not function in conjunction with the inventive technology, since the inventive technology uses water-based coatings.

Traditional prior art methods for transfer and lamination purposes rely on carrier substrates having high release silicone coatings that exhibit very poor surface energy. Silicone coated carrier substrates are not conducive to the invention, since the silicone would interfere with acceptance of the water-based release coatings used in the present invention. The application of a water-based coating to silicone coating carrier substrate would crawl or pull back from the substrate and not provide an evenly laid surface area. Thus, in contrast, to the prior art, the invention uses conventional market paper that does not incorporate silicone coatings as a carrier substrate.

Thus, the inventive method uses a water-based release coat that is applied to a carrier substrate that does not incorporate silicone coating. The water-based release coating is such that when exposed to heat and temperature it permanently bonds with the carrier substrate and remains stable. The release coat is allowed to dry on the substrate for a period of approximately thirty minutes.

A top-coat is applied on top of a contiguous first film formed from the dried release coat. The top-coat provides the desired surface finish, for example gloss or matte as well as providing durability and stain and fade resistance. A print-coat is applied on a contiguous second film formed from the dried top-coat. Preferably the top-coat and print coat are transparent.

A reverse mirror image of the desired graphic image is printed on a contiguous third film formed from the dried print-coat. The graphic image comprises, includes or consists of aqueous inks. The graphic image may be applied to the third film of the dried print-coat, preferably using water based inks and any convenient printing methods, including a conventional desktop inkjet printer or a commercial grade machine. The graphic image is thereafter allowed to dry for approximately thirty minutes in ambient temperatures of about twenty-five degrees Centigrade or higher.

A target substrate is coated with a primer coating in order to prepare the target substrate to receive the image that has been printed on the third film of the dried print coat.

The carrier substrate that has been coated with the release coating, the top coat, and the print coat super-imposed with the printed image is combined with the target substrate that has been pre-coated with a primer. The combined carrier substrate and target substrate are merged. In one embodiment, the carrier substrate and target substrate are placed in a heat press to allow the graphic image super-imposed on the dried print coat and top coat of the carrier substrate to merge with the target substrate that has been pre-coated with a primer coat. A modest amount of heat and pressure are applied to transfer the image from the carrier substrate to the target substrate. The carrier substrate including the first film of the dried release coat is thereafter peeled off or removed, leaving the target substrate pre-coated with the primer coat, a superimposed graphic on the print coat and top-coat.

Thus, the graphic image is super-imposed on the third film of the dried print coat and sandwiched between the target substrate that has been treated with the primer coat and the second film of the dried top-coat.

In an alternative embodiment, once the graphic image is printed on the contiguous third film formed from the dried print-coat and allowed to dry for approximately thirty minutes in ambient temperatures of about twenty-five degrees Centigrade or higher, the graphic image is sprayed with a sealant. Preferably, the sealant is formulated from a vinyl ester polymer dispersed in EPA certified VOC free eco-bio friendly solvents. The sealant may also be sprayed on the third film, thereby providing additional tensile strength to the graphic image and third film. The sealant provides a fine and contiguous film over the printed graphic. The sealant provides a waterproof seal over the graphic that has been printed with a water based ink. The sealant is advantageous when working with aqueous inks that comprise the graphic image since it prevents re-solubilizing of the aqueous ink and provides protection and strengthening characteristics to aqueous or solvent based inks.

The sealant applied to the graphic image and third film is allowed to air dry for a period of approximately thirty to forty-five minutes in ambient temperatures of about twenty-five degrees Centigrade or higher to form a contiguous sealant film. In this alternative embodiment, a primer coat is applied to the sealant film and third film. The primer coat may be transparent, opaque or contain a suitable pigment. Thus, in this embodiment, the sealant serves to protect the ink of the graphic image from the water based primer coat.

The target substrate is thereafter merged with the carrier substrate, including the first film, second film, third film, mirror image of the graphic, sealant film and fourth film. The carrier substrate and target substrate may be placed in a heat press to allow the graphic image super-imposed on the dried third film of the carrier substrate to merge with the target substrate. A modest amount of heat and pressure are applied to transfer the image from the carrier substrate to the target substrate. The carrier substrate including the first film of the dried release coat is thereafter peeled off or removed, leaving the target substrate, the fourth or primer film, the sealant film, the third or print film with a superimposed graphic, the second or top coat film.

An advantage of the present invention is that it uses conventional market paper and traditional printing methods to transfer multi-colored high-resolution graphics to a substrate without compromising the quality and supple feel of the substrate.

Another advantage of the invention is that it may be used to apply graphic images to planar or non-planar substrates using appropriate mechanical devices such as forming and molding.

Yet another advantage of the invention is the ability to print graphics using aqueous ink technology on conventional card stock paper. Aqueous inks are advantageous because they are economical, easy and safe to use. In addition, desktop printers and commercial printing equipment that operate using aqueous inks are considerably less expensive than printers using solvent based ink. Further, the maintenance cycle and cost of printers using water-based or aqueous ink technology is less expensive than that for solvent based ink.

The inventive method is well positioned to function with water-based or aqueous inks, since aqueous inks work well with paper and other absorbent surfaces such as fabric. It is noted that aqueous inks do not work well with plastic polymer films due to the lack of absorbency in these materials, since the ink does not wet the polymer surface well and thus provides an extremely poor resolution to the graphic or printed matter. Another disadvantage of using aqueous inks on plastic polymer films is that it takes an inordinately long time for the inks to dry. In addition, since the ink sits on the surface, it smudges very easily Still another advantage of the inventive method is that the coatings and substrates do not incorporate glue to adhere the image to the target substrate and thereby the coatings do not alter the natural feel of the target substrate or add weight or thickness to the target substrate. Thus, the invention allows surface enhancement of substrates that are unable to tolerate conventional coatings, sealants or primers that include glue, since glue can cause distortion and disfigurement of the substrate.

Yet another advantage of the inventive method is that it does not use silicone, silicone-based, thermoplastic or shape memory polymers.

Still yet another advantage of the inventive method is that it does not use expensive cold fusion or dye sublimation.

An advantage of the inventive method is that it does not require the use of high heat or pressure that could vary the original feel of the target substrate.

Another advantage of the method of the invention is that through the use of a top coat it enables various finishes including matte and gloss finishes.

A further advantage of the invention is that the coatings are all water-based and the method of the invention is very ecologically friendly.

Another advantage of the invention is that it allows the application of full color high resolution graphic images, without printing directly on the target substrate.

Still another advantage of the invention is that it allows the application of full color high resolution graphic images, using a conventional and basic ink jet printer.

An object of the invention is to use a carrier substrate that can transfer a graphic image to a target substrate without altering the general texture and pliability of the target substrate.

These and other aspects and advantages of the present disclosure will become apparent from the following detailed description of preferred embodiments of the invention considered in conjunction with the accompanying drawings, in which like drawings represent like components. It is to be understood, however, that the drawings are designed solely for purposes of illustration and not as a definition of the limits of the disclosure, for which reference should be made to the appended claims. Moreover, the drawings are not necessarily drawn to scale and that, unless otherwise indicated, they are merely intended to conceptually illustrate the structures and procedures described herein.

DETAILED DESCRIPTION OF THE INVENTION

Figure 1:
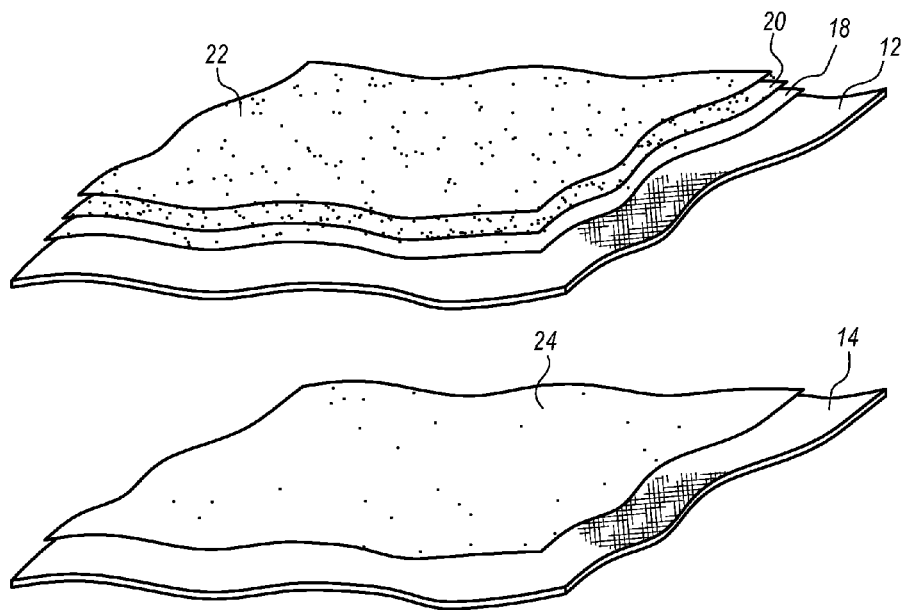
FIG. 1 is a perspective view of the carrier substrate and target substrate depicting the carrier substrate and target substrate with the layers of coatings of the invention.

Referring now to FIGS. 1 to 7 there is shown the method of the invention of initially applying a mirror image of a graphic 10 to a carrier substrate 12 using an ink jet printer 16 and thereafter transferring the graphic 10 from the carrier substrate 12 and superimposing the graphic 10 that is temporarily affixed on the carrier substrate 12 to a target substrate 14 by applying modest heat and pressure. A desktop ink jet printer, wide format printer or commercial grade printer may be used to apply the graphic 10 to the carrier substrate 12, so long as the printing technology uses liquid, aqueous or solvent based inks. It is noted that a laser printer generates too much heat to work well with the method of the invention.

The graphic 10 may be a monochromatic color or a complex multi colored high resolution graphic. The carrier substrate 12 is preferably a cellulosic non-woven material, such as for example conventional market paper used for book covers, business cards, poster boards, and the like, having a weight of twenty pounds or more. Preferably, the carrier substrate 12 is a heavy paper, such as card stock used in a business card having a weight of eighty pounds or more. In a preferred embodiment, the carrier substrate 12 comprises or consists of paper with a weight in the range of thirty-two to eighty pounds. The carrier substrate 12 may also comprise or consist of a polyester resin based printing stock, such as a polymer film. Preferably, the carrier substrate 12 is not a thermoplastic and does not include silicone. A liquid release coating 18 is applied to the carrier substrate 12 and allowed to dry into a first film 18. The liquid release coating 18 is preferably a water-based liquid polymer that exhibits emulsion properties and includes a fast air-drying ability such that it may be air-dried in approximately thirty minutes time given humidity levels below 70% and ambient temperatures generally between 24 and 30 degrees Centigrade. Drying may also be accelerated using warm air blowers, space heaters or overhead heating arrangements common in the printing and coating industry.

Once the release coat 18 has dried and created a first film 18, a liquid top coat 20 is applied over the first film 18 created by the dried release coating 18. The release coating 18 has an ability to accept additional water based coatings and remain stable and functional when exposed to high heat and pressure. In this regard, high heat and pressure refers to temperatures generally in the range of one hundred and fifty (150) degrees Centigrade and pressures in the range of one hundred and fifty (150) pounds per square inch. The release coating 18 comprises specific emulsion polymers and exhibits a cohesive chemistry with the top coat 20 in order to permit uniform wetting and coating of the top coat 20 that is laid down on the first film formed from the dried release coating 18.

In addition to the ability to accept the top coat 20 in a uniform manner, the release coating 18 should permit the peeling of the carrier substrate 12 from the top coat 20 while the release coating 18 itself stays bonded with the carrier substrate 12. The liquid release coat 18 and the top coat 20 have a cohesive relationship to ensure that the top coat 20 lays down smoothly and evenly over the entire surface of the dried liquid release coat 18, that is the first film 18 thus permitting the smooth and even application of a print coat 22 over the dried top coat 20. While the cohesive nature of the relationship between the liquid release coating 18 and top coat 20 is necessary for the foregoing stated reasons, it is important that the release coating 18 not be adhesive in nature which would result in the release coating 18 not being able to be removed from the target substrate 14 at the end of the graphic transfer process.

The release coat 18 is formulated with specific emulsion polymers that tolerate high temperature and pressure and also preferably have a tight microstructure with particle size in a range between 0.05 and 0.40 microns to resist penetration of the top-coat 20 polymer. The tight microstructure of the release coating 18 refers to the physical particle size of the emulsified polymer in the liquid release coating 18. Smaller particle size permits closer proximity of the particles in the dried release coating 18 that forms the first film, resulting in a tighter film matrix. The particle size of the polymer depends on the specific polymer and the manufacturing process. In a preferred embodiment, the release coat 18 is formulated with a polyester urethane. In a preferred embodiment, the emulsion polymers of the release coat have a particle size of 0.08 microns to resist the penetration of the top coat 20 that comprises particles larger than 0.10 microns. Thus, the combination prevents the top coat 20 from embedding and anchoring itself into the release coating 18, or the dried first film 18 which would prevent separation of the release coat 18 from the top coat 20 at the end of the transfer process.

In addition, the release coat 18 preferably includes nanostructure hydrophilic waxes in a range between 1.0% to 10% by volume. The hydrophilic waxes diffuse to the surface of the release coating 18 thereby augmenting its release properties. Preferably, the release coat 18 includes hydrophilic waxes such as PTFE (polytetrafluoroethylene) which have a high degree of temperature tolerance.

The top-coat 20 provides a desired surface finish, such as for example, gloss or matte. Preferably, the top-coat 20 is a water based polymer that provides durability and stain and fade resistance. Following the application of the top-coat 20 to the first film 18 on the carrier substrate 12, the top-coat 20 is allowed to dry to form a second film 20. As with the release coat 18, preferably the top coat 20 is fast air drying water based polymer.

The top coat 20 provides multi-level protection to the graphic 10 and protects the target substrate 14 on which the graphic image 10 adheres to, without being obtrusive. That is, the second film 20 does not make itself evident as an auxiliary coating and additionally does not alter the natural feel of the target substrate 14. The second film 20 formed by the dried top coat 20 provides resistance to everyday wear and tear, protection from water and other everyday liquids such as beverages, condiments, scuffing and fading and other damage caused by ultraviolet light exposure.

To achieve these properties the top coat 20 comprises or consists of water based polymer emulsions including acrylics, urethanes and hybrids of acrylics, urethanes and water based polymer emulsions to provide a crystal clear non-yellowing film that is extremely soft and resilient, which also exhibit excellent tensile strength and wear resistance and temperature tolerance.

The top coat 20 is formulated with a combination of urethanes to provide properties needed such as flexibility, tensile strength, abrasion resistance, stain resistance and UV resistance. These properties are essential for the type of objects that are targeted for the inventive technology. Failure in any one of these areas would render the treated object less than desirable. Since no single urethane exhibits all the desired properties, a combination of urethanes are used resulting in thirty (30%) to fifty (50%) percent overall urethane volume solids or volumetric mass.

In a preferred embodiment, the top coat 20 includes a class A level fire retardant for seating and other covering materials used in the interior decor of aircraft cabins, automobiles or luxury yachts.

It is also possible to include additives to the top coat 20 in order to affect the texture of the target substrate 14. The additives are essentially polymer waxes that attenuate the gloss of the top coat 20 to varying degrees. Additives may also contribute to improving the haptic feel of the top coat 20 thereby simulating the feel of natural leather. It is also possible to offer variations of the top coat 20 such as high gloss, medium gloss, satin and matte finish to modify surface appearance.

A water-based liquid polymer print coat 22 is applied to the second film 20 and allowed to dry. The dried water-based liquid polymer print coat 22 forms a third film 22. The mirror image graphic 10 is printed onto the third film 22. Any printing technology may be used, including a conventional desktop ink jet printer 16 as well as commercial grade printers (not shown). Thus the mirror image graphic 10 is superimposed on the third film 22. Preferably the print coat 22 is specifically formulated to accept all types of printing inks.

The print coat 22 is selected from a group of aqueous or water-based ink receptive polymers used in the manufacture of aqueous inks. The ink receptive polymers of the print coat 22 are effective at a percentage between twenty (20%) to forty (40%) percent by volume, in order to receive and absorb sufficient aqueous ink to produce vibrant colors, while not overwhelming the properties of the polymers necessary to form a graphic receptive film needed to bond with the fourth film 24 on the target substrate 14. The print coat 22 comprises or consists of styrenated acrylic polymers and hydrophilic additives such as nano alumina powders that are capable of absorbing and holding water based inks. Water based inks are generally considered to be the most difficult to absorb on polymer films. The print coat 22 is also compatible with solvent, eco-solvent, latex, and UV-cure based inks.

Aqueous or water based inks are generally formulated from liquids, including polymers used as carriers of a pigment. While aqueous inks work well with conventional absorbent materials such as paper and canvas they do not work well with polymer films which tend to have poor or no absorption capability. Since the graphic transfer printing process requires printing on polymeric films, the print coat 22 is formulated to readily accept conventional aqueous inks. Thus the preferred styrenated acrylics are those that are capable of supporting water based or aqueous inks. A small percentage in the range of about five (5%) to about (15%) percent of urethane from a select print capable group is also blended in to the print coat 22 to provide strength and added flexibility. Incorporating additives such as nano alumina powders to the print coat 22 enhances the water and color absorption properties of the print coat 22. It is noted that the print coat 22 is effective at twenty (20%) to forty (40%) percent by volume of the solids in the liquid print coat 22 before the liquid print coat 22 dries and becomes a contiguous third film 22. Volume of solids is essential so that the third film 22 has sufficient cross section to absorb the necessary amount of ink during the printing process. It is understood that volume is the physical space a material occupies. In polymer emulsions volume solids refers to the fluid ounces of a non-volatile solid material within a volume of liquid. Thus for example, a gallon with forty (40%) percent by volume of the solids will have a volume of fifty-one point two (51.2) fluid ounces of solids. That is forty (40%) percent of one hundred and twenty-eight (128) ounces. This same solid will also have weight based on the materials' specific gravity. Volume and weight are measured using water as a standard. For example, one gallon of water has one hundred and twenty-eight (128) fluid ounces and weighs eight point thirty-three (8.33) pounds per gallon. The specific gravity of water is stated as 1.0. While water has volume and weight, it does not have non-volatile durable solids since it can evaporate entirely.

A target substrate 14 is coated with a primer coat 24 that dries to form a contiguous fourth film 24. The primer coat 24 is allowed to air dry under conditions similar to the air drying conditions for the release coating 18, top coat 20 and print coat 22, namely, air dry in approximately 30 minutes time given humidity levels below 70 percent and ambient temperatures generally between 24 and 30 degrees Centigrade. The primer coat 24 is preferably a water-based liquid polymer that enables permanent bonding of the graphic image 10 that has been superimposed on the third film 22 to the fourth film 24 of the target substrate 14. Preferably, the primer coat 24 has adhesive quality. Although the primer coat 24 may exhibit an adhesive quality, it is not a glue.

The primer coat 24 should have a degree of softness and surface tack that jointly help the combined third film of the print coat 22 and second film of the top coat 20, embed into the fourth film of the primer coat 24 when subjected to heat and pressure at the stage of the graphic transfer process to the target substrate 14. The primer coat 24 consists of a combination of acrylic, styrene and urethane resins. Acrylic, styrene and urethane resins, each contribute generally five (5%) to fifteen (15%) percent of the overall twenty-five (25%) to forty-five (45%) percent solids of the primer coat 24. Thus the volumetric amount of the material solids of the primer coat 24 is twenty-five (25%) to forty-five (45%) percent, and each of the resins individually contribute five (5%) to fifteen (15%) percent of the collective total. The combination of acrylic, styrene and urethane resins contributes to the adhesion, flexibility, tack and tensile strength of the primer coat 24 and enhances the overall bonding mechanism. Thus, the primer coat 24 and primer film 24 is better able to anchor into the target substrate 14.

The primer coat 24 must retain flexibility when it dries to create the fourth film 24 such that the target substrate 14 to which the primer coat 24 is applied also retains its ability to bend and flex with relative ease. The primer coat 24 when dried to the fourth film 24 should also include an ability to stretch to one hundred and fifty (150%) percent of its original size and yet be able to revert to its original size. The primer coat 24 and dried fourth film 24 should exhibit temperature tolerance from thirty (30) degrees Centigrade to one hundred and fifty (150) degrees Centigrade. Notwithstanding the cohesive relationship between the liquid release coating 18 and the top coat 20, the relationship between the top coat 20, print coat 22 and primer coat 24 are cohesive and adhesive in nature. That is the top coat 20, print coat 22 and primer coat 24 need to remain firmly bonded to each other creating a single entity at the end of the graphic transfer process. Cohesion is the property of like molecules (of the similar substance) to stick to each other due to mutual attraction. In contrast, adhesion is the property of different molecules or surfaces to cling to each other on a more permanent basis.

Both the tensile and adhesive strength of the primer coat 24 should be high enough to permit the target substrate 14 to which it is applied to withstand flexing, stretching, bending and the other rigors that objects, such as for example, upholstery, footwear, apparel and handbags associated with the target substrate 14, are subjected to as part of normal use. The primer coat 24 ideally provides a broad range of adhesion such that it is capable of adhering to a broad array of target substrates 14, including for example, leather, vinyl, canvas and plastics. Such objects include without limitation, handbags, apparel, upholstery, footwear, and the like.

The molecular structure of the primer coat 24 preferably includes a small particle size to allow close proximity of the particles in the dried fourth film of the primer coat 24 resulting in a tighter film matrix and also increased penetration into the surface porosity of the target substrate 14 to which the primer coat is 24 is applied. In a preferred embodiment, the physical particle size of the molecular structure of the primer coat 24 is less than 0.10 microns of the emulsified polymer in the liquid state. In another preferred embodiment, the physical particle size of the molecular structure of the primer coat 24 is 0.08 microns of the emulsified polymer in the liquid state. This relationship of increased penetration between the primer coat 24 and target substrate 14 increases adhesion and enables the primer coat 24 to anchor into the target substrate 14.

The primer coat 24 is formulated from polymers that generally mirror the intrinsic properties of the polymers used in the top coat 20 and print coat 22 in order allow the coatings 20, 22 and 24 to bond and unite when the graphic transfer process of the invention is concluded. These intrinsic properties include, clarity, flexibility, temperature tolerance and an ability to blend and become part of the top coat 20 and print coat 22 when subjected to heat and pressure as part of the final process of the invention. The primer coat 24 includes an acrylic-urethane hybrid resin that has high adhesion. The primer coat 24 further includes resins that can accept water based pigments in the range of about five (5%) to fifteen (15%) percent to create a pigmented primer which is used for surface enhancement, such as re-coloring the surface or masking surface flaws of the target substrate 14.

Pliability of the dried primer coat 24 should be equal to or greater than pliability of the target substrate 14. To this end, polymers for the primer coat 24 are selected on the basis of two primary criteria, namely elongation, such as ultimate and elastic and tensile modulus. Ultimate elongation is the amount a material may be stretched before it breaks. Elastic elongation is the percent elongation you can reach without permanently deforming the material. The primer coat 24 should provide elastic elongation in the range of be at least three hundred (300%) to four hundred and fifty (450%) percent. Tensile modulus is the amount of pressure per square inch required to stretch the material to a certain percent of its original size. The fourth film 24 should also have sufficient tensile strength so that it is able to maintain its integrity when external forces such as stretching, bending and other distortions are applied to the target substrate 14. The tensile modulus is fifteen hundred (1500 psi) pounds per square inch or greater at three hundred (300%) percent of elongation. These criteria greatly exceed what would otherwise be possible using prior art methods for graphic transfer, for target substrates 14 such as leather, vinyl, canvas and other everyday materials used for apparel, upholstery, handbags, shoes, briefcases and similar objects.

The primer coat 24 is formulated from water based polymers and additives. A first group of additives comprise or consist of substances that help cross-link the molecular chain of the polymeric material that increases film strength and general performance. The first group of additives is included in a range of half (0.50%) to five (5.0%) percent. A second group of additives may include one or more substances that enhance the adhesion properties of the primer coat 24. The second group of additives belongs in the siloxane family that is included in a general range from one tenth (0.10%) to one point five (1.5%) percent. Once the primer coat 24 dries to a fourth film 24 its pliability has to be equal to or greater than the target substrate 14 to ensure that the fourth film 24 does not compromise the natural flex of the target substrate 14. The primer coat 24 and fourth film 24 need to have a broad range of adhesion properties to be able to form a permanent bond with a wide range of target substrates 14. Also, the fourth film 24 needs to bond and adhere with the third film 22 after being exposed to temperatures in the general range of one-hundred twenty-five (125) to one-hundred and forty (140) degrees Centigrade and pressure of seventy (70 psi) to ninety-five (95 psi) pounds per square inch.

In order to complete the transfer process, the carrier substrate 12 coated with the dried liquid release coating 18, top coat 20 and print coat 22 and the mirror image of the graphic 10 superimposed on the third film of the print coat 22 is placed on a target substrate 14 coated with the primer 24 that has dried to form a fourth film 24 and the assembly is subjected to modest heat and pressure to transfer the mirror image of the graphic 10 to the target substrate 14. Temperatures generally between one hundred and twenty (120) degrees Centigrade to generally one hundred and seventy-five (175) degrees Centigrade and pressure of seventy-five (75) psi (pounds per square inch) to one-hundred and fifty (150) psi (pounds per square inch). A preferred range for the transfer and laminating process is generally between one hundred and twenty five (125) to one hundred and forty (140) degrees Centigrade and requires pressure at generally between seventy (70) to ninety-five (95) pounds per square inch. The preferred temperature and pressure will depend on the material being laminated.

A combination of heat and pressure may be applied via a heat press such as the type used for applying appliqués to T-shirts, and the like. Laminating machines that use temperature and pressure controlled heated rollers may also be used. The carrier substrate 12 and the first film 18 are peeled away and removed from the target substrate 14, leaving an image of the graphic 10 superimposed on the third film sandwiched between the target substrate 14 and fourth film 24 and the second film 20. Preferably the second film 20 is weather proof and is resistant to wear and soil.

In one embodiment, the target substrate 14 that has been coated with the fourth film 24 is joined to the carrier substrate 12 coated with the first film 18, the second film 20 and print coat 22 superimposed with the mirror image of the graphic 10 using a heat press for a period in the range of approximately ten (10) to sixty seconds (60) before the carrier substrate 12 and the first film 18 are peeled back from the target substrate 14. The mirror image of the graphic 10 is transferred to the target substrate 14 using a heat press (not shown) for a period of time ranging from approximately ten (10) to sixty (60) seconds before the carrier substrate 12 with release coat 18 is removed. It is noted that the heat press should deliver even pressure all around. This method may be used on a planar as well as on a non-planar surface. If printing on a non-planar surface, appropriate mechanical devices such as vacuum forming or molding may be used.

In a preferred embodiment, the graphic image 10 is transferred to the target substrate 14 by placing the carrier substrate 12 and target substrate 14 in the heat press for two concurrent and consecutive cycles whereby each of the said cycles lasts for a period of generally twenty-four seconds each. The combined carrier substrate 12 and target substrate 14, films 18, 20, 22, 24 and graphic image 10, is removed from the heat press and allowed to cool to room temperature. The carrier substrate 12 and first film 18 are thereafter separated from the target substrate 14, leaving the graphic image 10, the second film 20, third film 22 and fourth film 24. The target substrate 14 with the graphic image 10, the second film 20, third film 22 and fourth film 24 is then placed in the heat press with the graphic image 10 facing the heated plate of the heat press. A thin sheet of a polytetrafluoroethylene material having a high temperature tolerance and good release properties, such as for example, Teflon® (not shown) is placed over the combined target substrate 14 graphic image 10, second film 20, third film 22 and fourth film 24. The combined target substrate 14 with the graphic image 10, the second film 20, third film 22 and fourth film 24 and polytetrafluoroethylene sheet is subjected to a heat and pressure cycle that lasts approximately for five seconds in order to finalize the graphic image transfer process.

The top-coat 20, print coat 22 and primer 24 are all water based liquid polymers that harmonize with one another. Coatings that harmonize with one another are desirable since they will lay down smoothly over each other without blemishes or other distortions when fully dry. The top coat 20, print coat 22 and primer coat 24 will harmonize and become one single coat, totally blended into each other and permanently inseparable. The cohesive nature of the coatings 20, 22 and 24 permits the top coat 20 to lay down smoothly over the first film 18. The first film 18 formed from the dried release coat 18 adheres to the carrier substrate 12 since the carrier substrate 12 is intrinsically porous. The carrier substrate 12 is a non-contiguous film and is comprised of, or consists of, cellulosic fibers. Thus, the release coat 18 adheres to and anchors into the carrier substrate 12 and is pulled off along with the carrier substrate 12 after the graphic 10 transfer. Selecting emulsion polymers from specific ecologically friendly polymer groups that have an intrinsic chemical affinity for one another and don't repel each other creates coating harmony.

The inventive method does not use solvent based polymers since solvent based polymers are hazardous due to their volatility and flammability and are contrary to an object of the invention which is to provide an eco-bio friendly method of transferring a graphic image to a substrate. Further, given the very high volatility of solvent based polymers, they tend to react strongly in case of incompatibilities as compared to the milder water based polymer emulsions preferred in this invention.

Properties that permit harmonization of the coatings, include Tg, the glass transition temperature at which a solid polymer changes to a liquid state, and MFFT, the minimum film formation temperature at which the liquid polymer emulsion becomes a contiguous film with inherent properties of the specific polymer, as well as elongation, tensile strength, and the like.

The polymer emulsions for the release coat 18, top coat 20, print coat 22 and primer coat 24 are selected from the group comprising or consisting of water based acrylic, urethane and related hybrid polymer emulsions such as for example, styrenated acrylics, acrylic-urethane, and the like, as opposed to solvent based polymer emulsions. The polymers are water based, since water is one of the components of the emulsification process. Thus, the polymer can be further diluted with water to arrive at a desired polymer solids value. Once the water and other volatile materials have evaporated from the release coat 18, top coat 20, print coat 22 and primer coat 24 and the polymers have formed a dry film(s), the film(s) is/are no longer affected by water or liquids and cannot be re-dissolved to restore the polymers original state.

It is important to note that within each group there are certain polymers that do not exhibit chemical affinity for one another due in part to materials used in the manufacturing process of the polymers. For example, coalescing agents, such as solvents that enable a polymer to form a contiguous film once the volatiles have evaporated, or surfactants that help wet out the substrate that the polymer is applied to, and the like. The manufacturer generally selects the particular coalescing agents and surfactants used in the manufacture of acrylics and urethanes. Thus, it is important to select polymer emulsions in which the coalescing agents, surfactants and pH levels of the polymer emulsions are compatible to promote mutual adhesion and prevent destabilization.

Additional properties that are significant for achieving harmony between the coatings include, ionic values, such as anionic, cationic and nonionic. It is important to ensure harmony between the polymers selected for blending or else the polymers will react with one another in an undesirable manner and either immediately coagulate or coagulate in time and with exposure to other destabilizing factors such as ambient temperature.

Non-harmonious coatings, may refuse to bond with one another, resulting in total failure of the inventive process. Other consequences of non-compatible coatings include wrinkling or uneven wetting. Cracking and peeling are also evidence of lack of chemical harmony. Harmonious coatings will lay down smoothly over each other without blemishes or other distortions and when fully dry they will become as one single coat, totally blended into each other and permanently inseparable.

The release coating 18, top-coat 20, the print coat 22 and primer coat 24 are all water based and exhibit fast and air drying capabilities. At humidity levels below seventy (70%) percent and ambient temperatures generally between twenty-four (24) and thirty (30) degrees Centigrade, each of the coatings, 18, 20, 22, and 24, should require no more than thirty (30) minutes to become fully dry and available for handling or other processes.

Drying can also be accelerated by creating a warm airflow in the general range of thirty (30) to thirty-five (35) degrees Centigrade, over the carrier substrate 12 and/or target substrate 14. Warm air flow may be provided using air blowers, space heaters or overhead heating arrangements common in the printing and coating industry.

In an alternative embodiment, the primer coat 24 is not applied to the target substrate 14 directly and allowed to dry. In this alternative embodiment, once the mirror image of the graphic 10 is printed on the contiguous third film 22 formed from the dried print-coat 22 and allowed to dry for approximately thirty minutes in ambient temperatures of about twenty-five degrees Centigrade or higher, a sealant 26 is applied to the graphic image 10. The sealant 26 exhibits chemical harmony with the top-coat 20, print coat 22 and primer coat 24. Preferably, the sealant 26 is formulated from a vinyl ester polymer dispersed in EPA certified VOC free eco-bio friendly solvents. In another embodiment, the sealant 26 may be applied on the entire third film 22 including the graphic image 10, thereby providing additional tensile strength to both the graphic image 10 and third film 22. The sealant 26 is advantageous when working with aqueous inks that comprise the graphic image 10 since it prevents re-solubilizing of aqueous inks and provides strengthening characteristics to aqueous and solvent based inks.

After applying the sealant to the graphic image 10, the sealant is allowed to air dry for a period of approximately thirty to forty-five minutes in ambient temperatures of about twenty-five degrees Centigrade or higher to form a contiguous sealant film 26. In this alternative embodiment, the primer coat 24 is applied to the sealant film 26 and third film 22. The primer coat 24 may be transparent, opaque or contain a suitable pigment. Thus, in this embodiment, the sealant 26 serves to protect the ink of the graphic image 10 from the water based primer coat 24.

The target 14 substrate is thereafter merged with the carrier substrate 12, including the first film 18, second film 20, third film 22, mirror image of the graphic 10, sealant film 26 and fourth film 24. The carrier substrate 12 and target substrate 14 may be placed in a heat press to allow the graphic image 10 super-imposed on the dried third film 22 of the carrier substrate 12 to merge with the target substrate 14. A modest amount of heat and pressure are applied to transfer the image 10 from the carrier substrate 12 to the target substrate 14. The carrier substrate 10 including the first film 18 of the dried release coat 18 is thereafter peeled off or removed, leaving the target substrate 14, the fourth film 22 formed from the dried primer coat 22, the sealant film 26 formed from the dried sealant 26, the third film 22 formed from the dried print film 22 with the superimposed graphic 10, the second film 20 formed from the dried top coat 20.

Referring now in particular to FIG. 1, there is shown a perspective view of the carrier substrate 12 coated with the release coat 18 that has dried to form the first film 18, the top coat 20 that has dried to form the second film 20 and the print coat 22 that has dried to form the third film 22. There is also shown the target substrate 14 coated with the primer coat 24 that has dried to form the fourth film 24.

Figure 2:
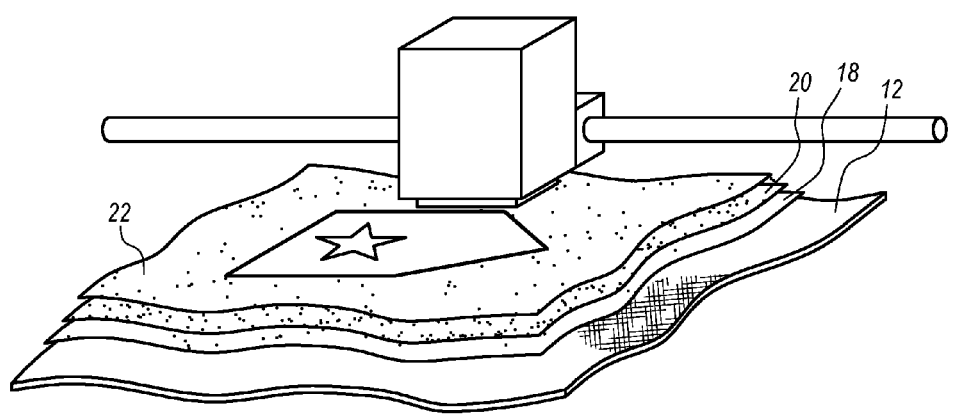
FIG. 2 is a perspective view of the carrier substrate depicting the mirror image of the graphic being printed on the carrier substrate using a conventional inkjet printer.

Referring to FIG. 2, there is shown perspective view of the carrier substrate 12 depicting the mirror image of the graphic 10 being printed on the carrier substrate 12 using a conventional inkjet printer 16.

Figure 3:
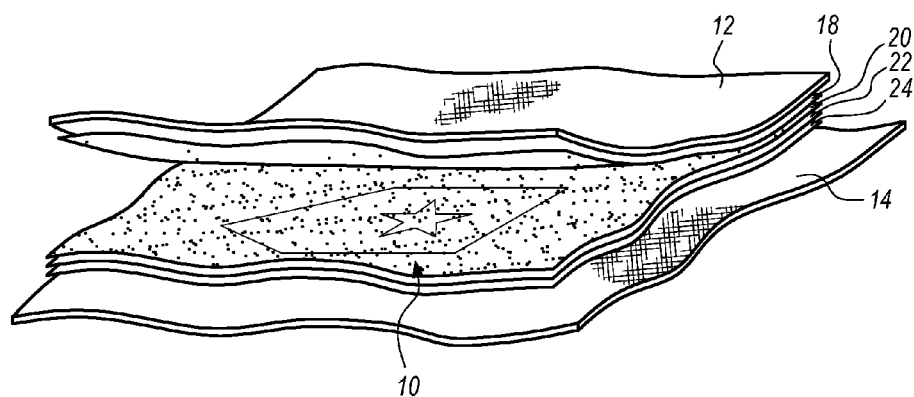
FIG. 3 is a cutaway view of the carrier substrate united with the target substrate depicting the layers of the carrier substrate and release coating being peeled away leaving the graphic image superimposed on the target substrate and sandwiched between the top coat and target substrate.

FIG. 3 is a cutaway view of the carrier substrate 12 united with the target substrate 14 depicting the layers of the coated carrier substrate 12 and coated target substrate 14 as the carrier substrate 12 and first film 18 are being peeled away leaving the graphic image 10 on the third film 22 superimposed on the target substrate 14, the graphic image 10 sandwiched between the second film 20 on the one hand and the fourth film 24 on the other hand.

Figure 4:
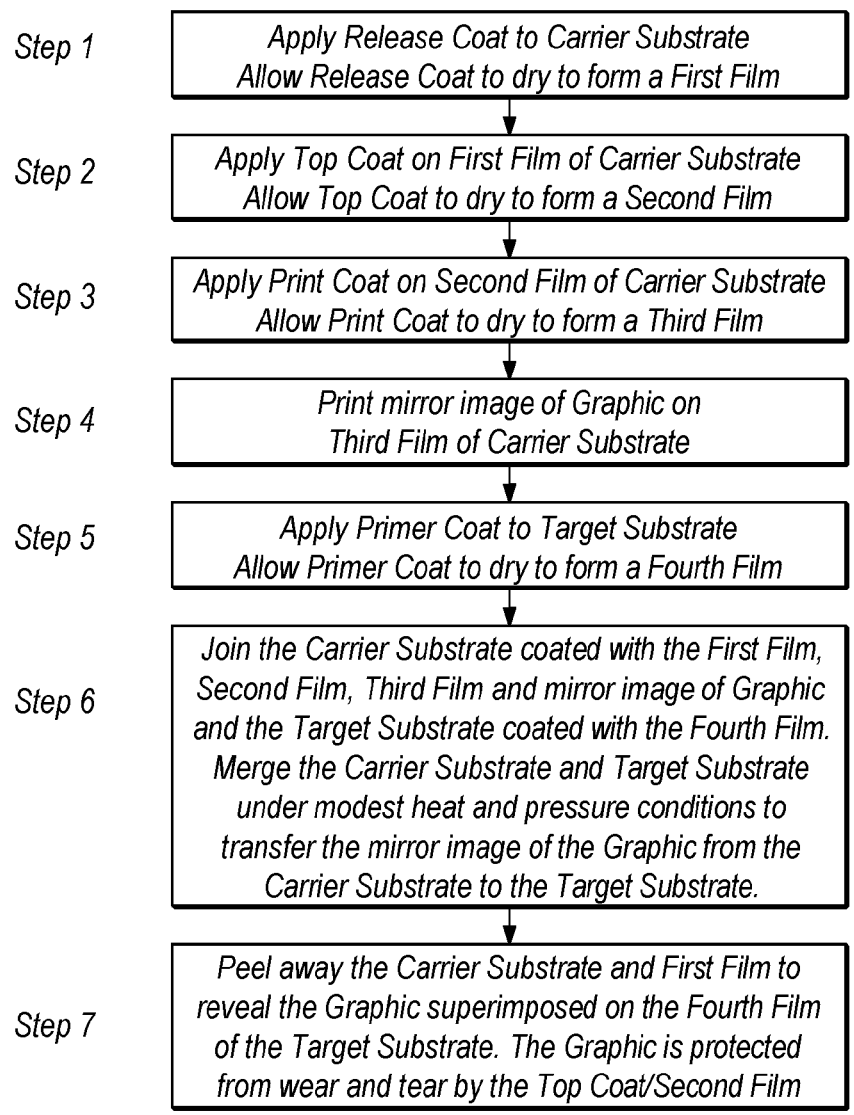
FIG. 4 is a flow chart of the inventive method of using a carrier substrate to apply and affix a graphic to a target substrate.

FIG. 4 is a flow chart of the method of invention of transferring a carrier substrate to apply and affix a graphic to a target substrate.

Figure 5:
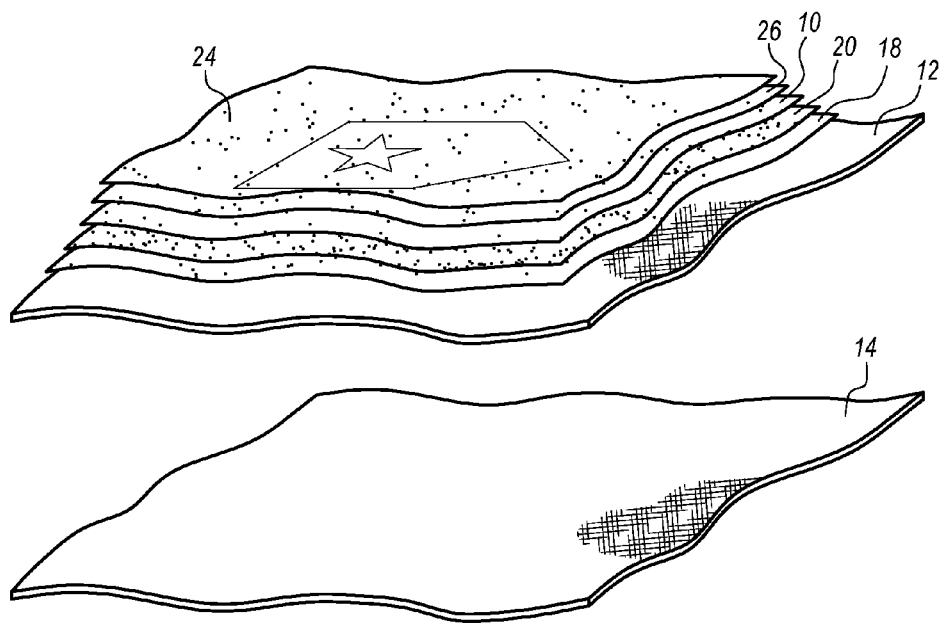
FIG. 5 is a perspective view of the carrier substrate and target substrate depicting an alternative embodiment illustrating the carrier substrate with the layers of coatings and the sealant and the target substrate of the invention before the carrier substrate and target substrate are merged.

FIG. 5 is a perspective view of the carrier substrate 12 and target substrate 14 depicting an alternative embodiment illustrating the carrier substrate 12 with the layers of coatings, namely the release coat 18 that has dried to form the first film 18, the top coat 20 that has dried to the second film 20, the print coat 22 that has dried to form the third film 22, the mirror image of the graphic 10, the sealant coat 26 that has dried to form the sealant film 26 and the primer coat 24 that has dried to form the fourth film 24 and the target substrate 14 of the invention before the carrier substrate 12 and target substrate 14 are merged.

Figure 6:
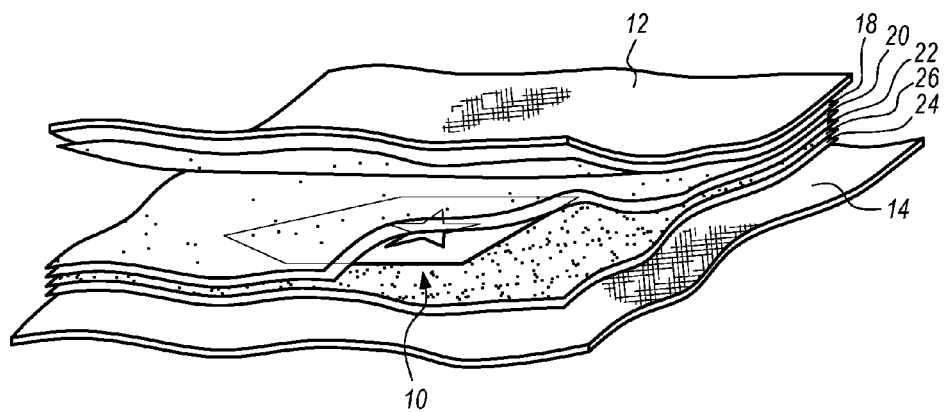
FIG. 6 illustrates an alternative embodiment of the present invention and shows a cutaway view of the carrier substrate united with the target substrate depicting the layers of the carrier substrate and release coating being peeled away leaving the graphic image superimposed on the target substrate and sandwiched between the top coat and target substrate.

FIG. 6 is a cutaway view of an alternative embodiment of the invention and illustrates the carrier substrate 12 united with the target substrate 14 depicting the layers of the coated carrier substrate 12 and target substrate 14 as the carrier substrate 12 and first film 18 are being peeled away leaving the graphic image 10 that has been affixed on the third film 22 superimposed on the target substrate 14 sandwiched between the second film 20 on the one hand and the sealant film 26 on the other hand.

Figure 7:
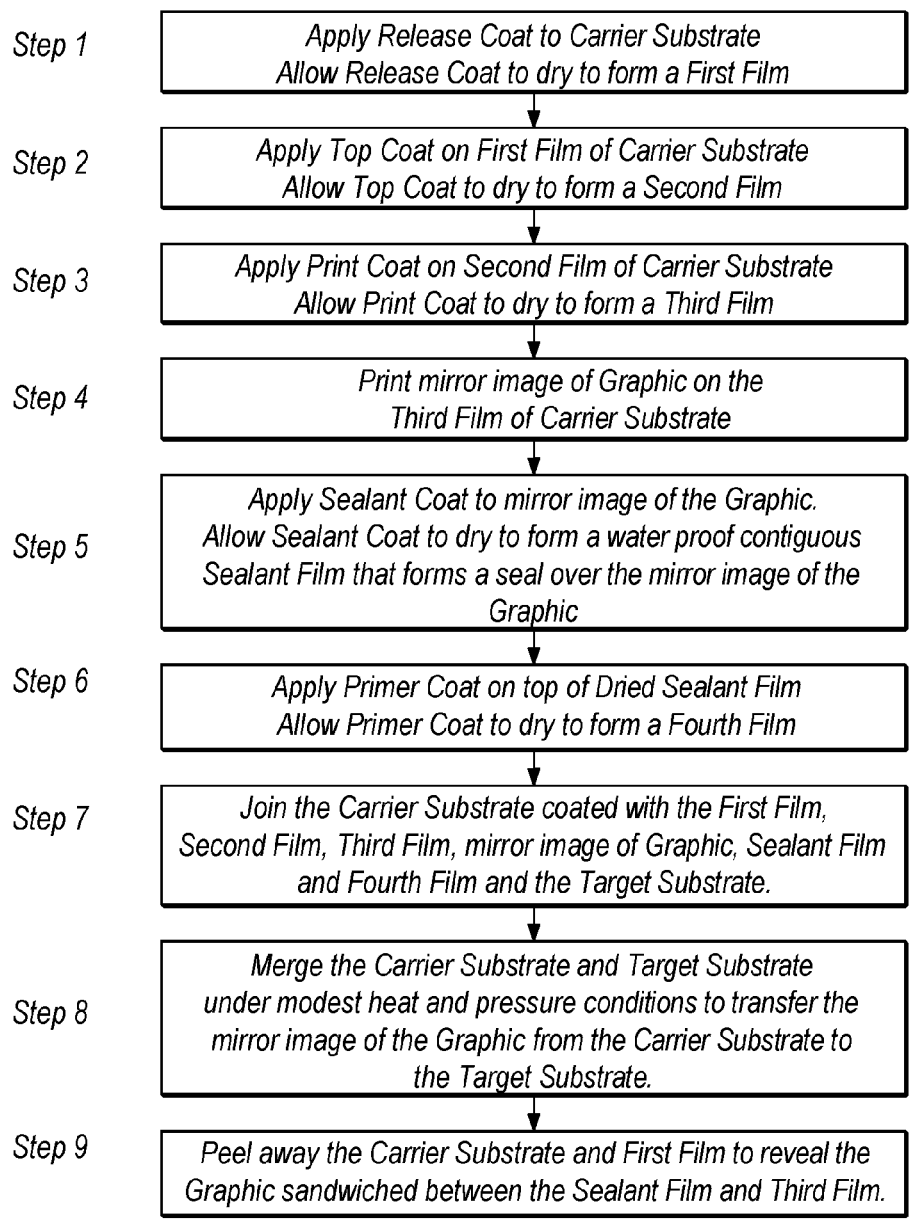
FIG. 7 is a flow chart of an alternative embodiment of the inventive method of using a carrier substrate to apply and affix a graphic to a target substrate.

FIG. 7 is a flow chart of an alternative embodiment of the inventive method of using a carrier substrate 12 to apply and affix a graphic 10 to a target substrate 14.

Thus, while there has been shown and described, fundamental novel features of the disclosure as applied to various specific embodiments thereof, it will be understood that various omissions and substitutions and changes in the form and details of the apparatus illustrated, and in their operation, may be made by those skilled in the art without departing from the spirit of the disclosure. For example, it is expressly intended that all combinations of those elements and/or method steps which perform substantially the same function, in substantially the same way, to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore to be limited only as indicated by the scope of the claims appended hereto.

What is claimed is:

1. A method of applying a graphic to a target substrate, the method comprising:
    applying a water based release coat to a carrier substrate and allowing the water based release coat to dry to form a first film on the carrier substrate;
    applying a water based top coat to the first film on the carrier substrate and allowing the water based top coat to dry to form a second film;
    applying a water based print coat to the second film on the carrier substrate and allowing the water based print coat to dry to form a third film;
applying a reverse mirror image of the graphic to the third film;
    applying a sealant to the mirror image of the graphic and allowing the sealant to dry to form a sealant film;
    applying a water based primer coat to the sealant film and allowing the water based primer coat to dry to form a fourth film;
    combining a first part, the first part comprising the carrier substrate including the first film, second film, third film, the third film superimposed with the reverse image of the graphic, the sealant film and the fourth film and a second part, the second part comprising the target substrate, such that the reverse image of the graphic is positioned between the sealant film and the third film;
    applying sufficient heat and pressure to the combined first part and second part in order to transfer the reverse image of the graphic from the carrier substrate to the target substrate; and peeling away the carrier substrate and first film from the combined first part and second part, thereby leaving behind the target substrate including the fourth film, the sealant film, the graphic superimposed between the sealant film and the third film, and the second film once the carrier substrate and first film are separated from the combined first part and second part.

2. The method of claim 1, wherein the sealant comprises a vinyl ester polymer.

3. The method of claim 1 wherein the heat applied to combine the first part and the second part is in the range of 120 degrees to 175 degrees Centigrade and the pressure applied to combine the first part and the second part is in the range of 75 pounds per square inch to 150 pounds per square inch.

4. The method of claim 1 wherein the carrier substrate comprises market paper having a weight of twenty pounds or more.

5. The method of claim 1, wherein the reverse mirror image of the graphic is applied to the third film using a ink jet printer.

6. The method of claim 1, wherein the graphic comprises aqueous inks.

7. The method of claim 1, wherein the release coat does not include an adhesive and comprises emulsion polymers that exhibit a cohesive chemistry with the top coat in order to permit uniform wetting and coating of the top coat that is laid down on the first film.

8. The method of claim 1, wherein the release coat comprises a tight molecular microstructure with a particle size in a range between 0.05 and 0.40 microns in order to resist penetration of the top coat.

9. The method of claim 1, wherein the release coat includes nanostructure hydrophilic waxes in a range between 1.0% to 10% by volume and whereby the hydrophilic waxes diffuse to the surface of the release coat thereby augmenting the release properties of the first film.

10. The method of claim 1, wherein the top coat comprises particles having a particle size larger than 0.10 microns.

11. The method of claim 1, wherein the top coat is an air drying water based polymer including polymer waxes for providing durability, stain and fade resistance and a desired surface finish.

12. The method of claim 1, wherein the top coat comprises a combination of urethanes resulting in overall urethane solids in a range of 30% to 50% by volume.

13. The method of claim 1, wherein the top coat comprises water based polymer emulsions including acrylics, urethanes and hybrids of the acrylics and urethanes to provide a crystal clear non-yellowing film that is soft and resilient.

14. The method of claim 1, wherein the print coat comprises styrenated acrylic polymers and hydrophyllic additives capable of absorbing and retaining aqueous inks.

15. The method of claim 1, wherein the print coat comprises urethane selected from a print capable group in the range of 5% to 15% by volume.

16. The method of claim 1, wherein the print coat comprises a volume of solids, and wherein the print coat is effective at 20% to 40% by volume of the solids in the water-based print coat.

17. The method of claim 1, wherein the primer coat exhibits properties relating to softness and surface tack that jointly help the combined third film and second film embed into the fourth film when subjected to the heat and pressure during the transfer of the graphic to the target substrate.

18. The method of claim 1, wherein the fourth film includes an original shape and dimension and exhibits an ability to stretch to 150% percent of the original shape and dimension and later revert back to the original shape and dimension.

19. The method of claim 1, wherein the primer coat comprises a combination of acrylic, styrene and urethane resins and further comprises a volume of solids, and wherein each of the acrylic, styrene and urethane resins, comprise 5% to 15% of the volumetric solids of the primer coat and exhibit high properties of adhesion.

20. The method of claim 1, wherein the primer coat comprises a volume of material solids, and wherein the volumetric amount of each of the material solids of the primer coat is twenty-five (25%) to forty-five (45%) percent.

21. The method of claim 1, wherein the primer coat includes a molecular microstructure having a particle size small enough to allow close proximity of the particles in the fourth film thereby resulting in a tight film matrix and penetration into a surface porosity of the target substrate.

22. The method of claim 1, wherein the primer coat includes a molecular structure having a particle size that is between 0.05 and 0.10 microns of the emulsified polymer of the primer coat in the liquid state.

23. The method of claim 1, wherein the primer coat includes elongation and tensile modulus properties such that the fourth film provides a first pliability factor equal to or greater than a second pliability factor of the target substrate.

24. The method of claim 1, wherein the fourth film exhibits elastic elongation in the range of 300% to 450% of its original size.

25. The method of claim 1, wherein the release coat, top-coat, print coat and primer coat, each exhibit air drying properties at humidity levels below 70% and ambient temperatures between 24 and 30 degrees Centigrade.

26. The method of claim 1, wherein the release coat, top coat, print coat and primer coat exhibit harmonious properties relating to, glass transition temperature, minimum film formation temperature, elongation, tensile strength, coalescing agents, surfactants, ionic values and pH levels in order to promote mutual cohesion and prevent destabilization.

27. The method of claim 1, wherein the release coat, top coat, print coat and primer coat are polymer emulsions selected from a group consisting of water based acrylics, urethanes and hybrid polymer emulsions.

28. A method of applying a graphic to a target substrate, the method comprising:
applying a water based release coat to a carrier substrate and allowing the water based release coat to dry to form a first film on the carrier substrate; applying a water based top coat to the first film on the carrier substrate and allowing the water based top coat to dry to form a second film;
applying a water based print coat to the second film on the carrier substrate and allowing the water based print coat to dry to form a third film;
applying a reverse mirror image of the graphic to the third film;
applying a water based primer coat to the target substrate and allowing the water based primer coat to dry to form a fourth film;
combining a first part, the first part comprising the carrier substrate including the first film, second film, third film, the third film superimposed with the reverse image of the graphic and a second part, the second part comprising the target substrate and fourth film, such that the reverse image of the graphic is positioned between the fourth film and the third film;
applying sufficient heat and pressure to the combined first part and second part in order to transfer the reverse image of the graphic from the carrier substrate to the target substrate; and
peeling away the carrier substrate and first film from the combined first part and second part, thereby leaving the target substrate including the fourth film, the graphic superimposed between the fourth film and the third film, and the second film once the carrier substrate and first film are separated from the combined first part and second part.

* * * * *